US011277166B2

(12) United States Patent
Zeng et al.

(10) Patent No.: US 11,277,166 B2
(45) Date of Patent: Mar. 15, 2022

(54) OCCUPANCY SENSING USING ULTRA-WIDE BAND

(71) Applicant: Robert Bosch GmbH, Stuttgart (DE)

(72) Inventors: Yunze Zeng, San Jose, CA (US); Yongsen Ma, Sunnyvale, CA (US); Vivek Jain, Sunnyvale, CA (US)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/913,271

(22) Filed: Jun. 26, 2020

(65) Prior Publication Data

US 2021/0409067 A1 Dec. 30, 2021

(51) Int. Cl.
| H04B 1/00 | (2006.01) |
| H04B 1/7183 | (2011.01) |
| H04B 1/7163 | (2011.01) |
| H04W 24/10 | (2009.01) |
| H04B 1/719 | (2011.01) |
| H04B 1/69 | (2011.01) |

(52) U.S. Cl.
CPC .......... *H04B 1/7183* (2013.01); *H04B 1/719* (2013.01); *H04B 1/71632* (2013.01); *H04W 24/10* (2013.01); *H04B 2001/6908* (2013.01)

(58) Field of Classification Search
CPC .. H04B 1/7183; H04B 1/71632; H04B 1/719; H04B 2001/6908; H04W 24/10
USPC ................................ 375/130, 219, 295, 316
See application file for complete search history.

(56) References Cited

U.S. PATENT DOCUMENTS

| 10,515,548 | B2 | 12/2019 | Nagao | |
| 2009/0046538 | A1 | 2/2009 | Breed et al. | |
| 2015/0050944 | A1* | 2/2015 | Ekbatani | H04W 4/35 455/456.1 |
| 2020/0055692 | A1 | 2/2020 | Marpu et al. | |
| 2021/0107380 | A1* | 4/2021 | Jo | B60R 25/01 |

* cited by examiner

*Primary Examiner* — Zewdu A Kassa
(74) *Attorney, Agent, or Firm* — Brooks Kushman P.C.

(57) ABSTRACT

Occupancy sensing using ultra-wideband (UWB) keyless infrastructure is provided. Channel impulse response (CIR) measurements are received from a plurality of UWB transceiver nodes arranged about a plurality of locations. A classification model it utilized to predict occupancy of each of the plurality of locations based on CIR tensors formed from the CIR measurements for each of the UWB transceiver nodes.

18 Claims, 12 Drawing Sheets

OCCUPANCY SENSING USING ULTRA-WIDE BAND

TECHNICAL FIELD

The present disclosure relates to occupancy sensing using wireless communications such as ultra-wide band communications.

BACKGROUND

Vehicle occupancy has been an active area of interest, both for supporting regulatory requirements and for providing good user experience. At the base level, vehicles may detect occupancy in front seats to provide seat belt reminders. Such a system can also provide additional features such as airbag control and enhanced user experience with regards to climate and audio controls. Vehicle occupancy information is also a component for effective shared autonomy, such as human sensing, shared perception-control, and deep personalization, for human-centered autonomous vehicle systems.

SUMMARY

In one or more illustrative examples, a method for occupancy sensing using ultra-wideband (UWB) keyless infrastructure is provided. Channel impulse response (CIR) measurements are received from a plurality of UWB transceiver nodes arranged about a plurality of locations. A classification model is utilized to predict occupancy of each of the plurality of locations based on CIR tensors formed from the CIR measurements from each of the UWB transceiver nodes.

In one or more illustrative examples, a system for occupancy sensing using wireless communications is provided. A computing device including a processor programmed to receive channel impulse response (CIR) measurements from a plurality of wireless transceiver nodes arranged about a plurality of locations, and utilize a classification model to predict occupancy of each of the plurality of locations based on CIR tensors formed from the CIR measurements from each of the wireless transceiver nodes.

In one or more illustrative examples, a non-transitory computer-readable medium includes instructions for occupancy sensing using ultra-wideband (UWB) that, when executed by a processor, cause the processor to receive channel impulse response (CIR) measurements from a plurality of UWB transceiver nodes arranged about a plurality of locations; and utilize a classification model to predict occupancy of each of the plurality of locations based on CIR tensors formed from the CIR measurements from each of the UWB transceiver nodes

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
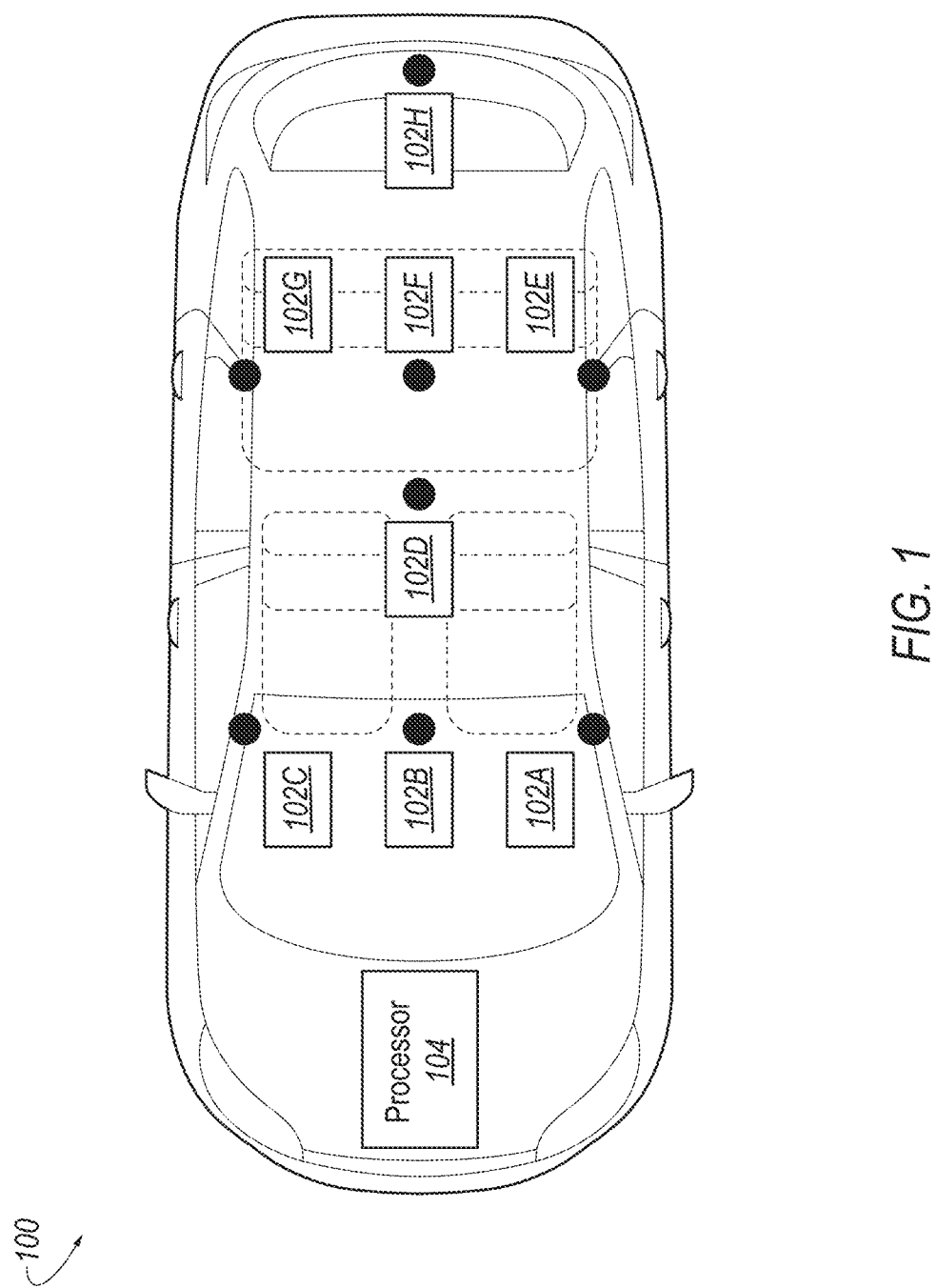
FIG. 1 shows an example system for use in occupancy sensing using ultra-wide band keyless infrastructure.

FIG. 1 shows an example system 100 for use in occupancy sensing using ultra-wide band keyless infrastructure. The system 100 includes a deployment of a plurality of Ultra-Wideband (UWB) transceiver nodes 102 within a vehicle cabin. As shown, the system 100 utilizes eight UWB transceiver nodes 102, but more or fewer may be used. One of the UWB transceiver nodes 102 may broadcast UWB packets, while the other nodes collect channel impulse response (CIR) measurements. These CIR signals may be provided to a processor 104 which receives the raw CIRs, processes the CIRs to align them in time, and feeds the aligned CIRs to a multi-input multi-output convolutional neural network (CNN) with a multi-task mask (referred to herein as a MaskMIMO), to perform per-seat occupancy classification. In the event where multiple UWB channels are available, then one or more UWB transceiver nodes 102 can also transmit in parallel with one or more UWB transceiver nodes 102 listening to each of the UWB transceiver nodes 102, thereby allowing for measurements on multiple channels to be taken at the same time.

The UWB transceiver nodes 102 are configured to operate using UWB radio technologies. UWB is a popular technology to provide high accuracy localization, asset tracking and access control applications. Due to the accurate ranging feature and robustness to relay attacks, vehicle manufacturers are upgrading the keyless entry infrastructure to UWB-based systems. In many examples UWB refers to signals that have a bandwidth larger than 500 MHz or 20% of the arithmetic center frequency. In many examples, the frequency range of UWB is from 3.1 to 10.6 GHz, and the Power Spectral Density (PSD) limit for UWB transmitters is −41.3 dBm/MHz. An advantage of UWB is the large bandwidth that provides much better time/spatial resolution than other wireless technologies. Generally, the time resolution of wireless sensing is $\tau=1/B$ where B is the channel bandwidth. UWB has bandwidth larger than 500 MHz, so its time resolution may be better than 2 nanoseconds. This accordingly corresponds to a potential spatial resolution of 60 centimeters for electromagnetic waves with speed of $3\times10^8$ meters/second. UWB provides more fine-grained sensing capabilities, especially for in-vehicle environments with strong multi-path efforts, compared with other wireless sensing technologies. Moreover, UWB is more energy efficient and has lower interference than other wireless technologies, since UWB has lower power consumption. Because of the high time/spatial resolution, low power consumption, and low interference, UWB is suitable for in-vehicle occupancy sensing.

The UWB transceiver nodes 102 may be used as keyless entry infrastructure, as an alternative to passive keyless entry systems that uses a combination of Low Frequency (LF) and Ultra-High Frequency (UHF) channels to measure the proximity of the key fob to check if the key fob is inside or within a certain range (e.g., 2 m) of the vehicle. UWB has advantages for use in keyless entry, one of which being that UWB radios carry explicit timing information as defined in the IEEE 802.15.4-2015 UWB standard, thereby thwarting relay attacks as signals coming from a relay device would take too much longer time to be received by the vehicle as compared to legitimate signals from a local key. Moreover, with UWB radios being implemented in smartphones, users may no longer need to carry additional key fobs. Instead, the users may use their UWB-enabled smartphones to lock/unlock/start their vehicles.

The transmit signal of an UWB transceiver node 102 operating as a transmitter is a sequence of pre-defined symbols in the IEEE 802.15.4 format. These UWB data packets are sometimes referred to as "blinks." These signals may travel through multiple paths and arrive at a UWB transceiver node 102 operating as a receiver with different amplitude attenuation and time of flight. The received signal may be compared with the known sequence of transmit symbols to compute the CIR as follows:

$$h(t)=\Sigma_{i=1}^{N} a_i \delta(t-\tau_i) \quad (1)$$

where:
$a_i$ is the amplitude of the i-th path;
$\tau_i$ is the time of flight of the i-th path; and
$\delta(\cdot)$ is the Dirac delta function.

The UWB CIR represents the multi-path profile of how the transmit signal travels through the environment around the transmitter and receiver. A time series of CIRs represents multi-path profile variations caused by any changes of the multi-path environment. This is an aspect of how the CIRs can be used for occupant sensing.

Figure 2:
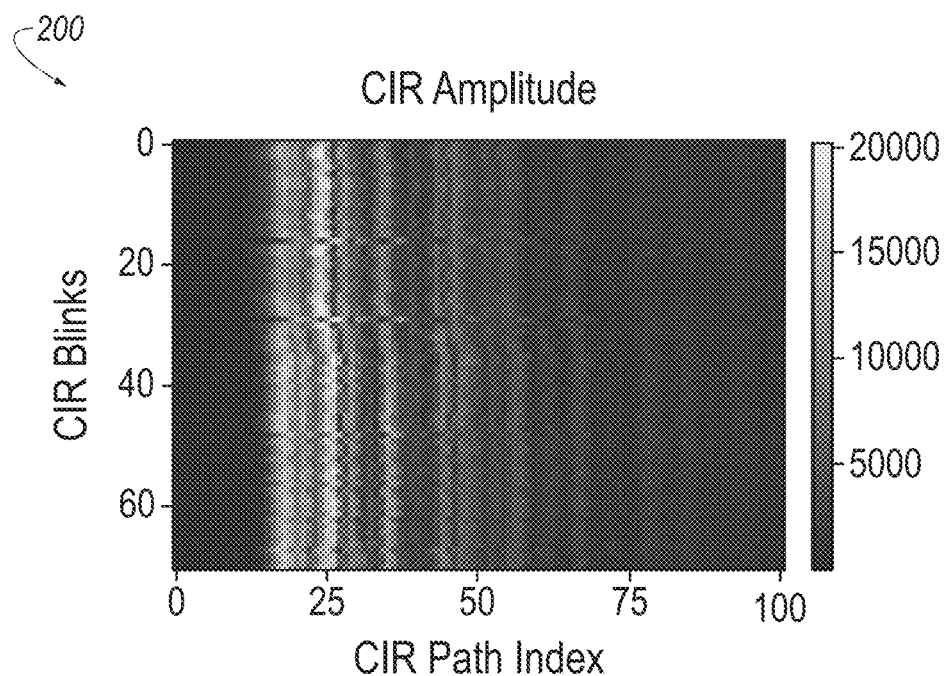
FIG. 2 shows a heatmap of channel impulse response (CIR) amplitude measured from multiple CIR blinks.

FIG. 2 shows a heatmap 200 of the CIR amplitude measured from multiple CIR blinks. As shown, the Y-Axis of the heatmap 200 represents the number of CIR blinks, while the X-Axis represents an index over time of the number of the CIR path being illustrated. Note that not all CIR paths are shown in the heatmap 200. Instead, a truncated window of CIRs is provided, in this example 15 paths before and 85 paths after the first path index. The CIR heatmap 200 can be fed into signal processing techniques and machining learning algorithms for different sensing purposes.

Figure 3:
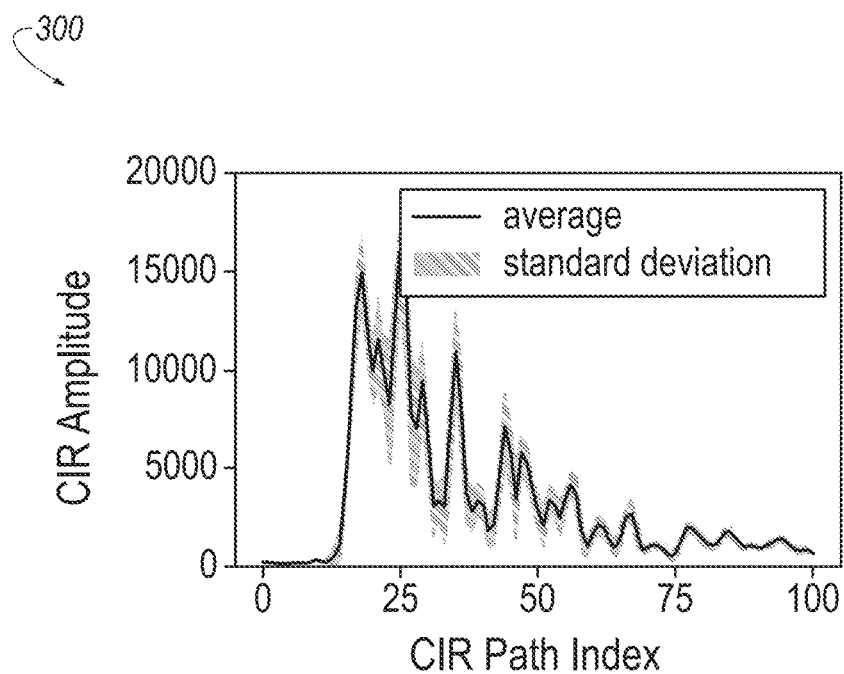
FIG. 3 shows a graphical representation of the CIR as an average and standard deviation of the heatmap shown in FIG. 2.

FIG. 3 shows a graphical representation 300 of the CIR as an average and standard deviation of the heatmap shown in FIG. 2. As shown, the Y-Axis represent CIR amplitude, while again the X-Axis represents an index of the number of the CIR path being illustrated. This allows the CIR amplitude to be observed over time. In addition to amplitude and standard deviation, different features, such as peaks/valleys, distances between peaks/valleys, number of peaks/valleys, etc., can be calculated and also fed to machine learning algorithms for different sensing purposes.

Since CIRs are impacted by multi-path signal reflections from objects and humans in the vehicle, CIR variations in heatmaps and average and standard variation can be used for vehicle occupancy sensing. Thus, as vehicle occupancy monitoring is useful in support of regulatory requirements and for providing a customized user experience, the keyless infrastructure supported by the UWB transceiver nodes 102 may be additionally utilized in an orthogonal sensing modality to detect vehicle occupancy. As the system 100 leverages the existing keyless infrastructure, the system 100 may operate utilizing the same UWB transceiver nodes 102 included inside the vehicle for keyless entry. Further, the system 100 does not have location-specific requirements and hence can utilize the existing installed UWB transceiver nodes 102.

Figure 4:
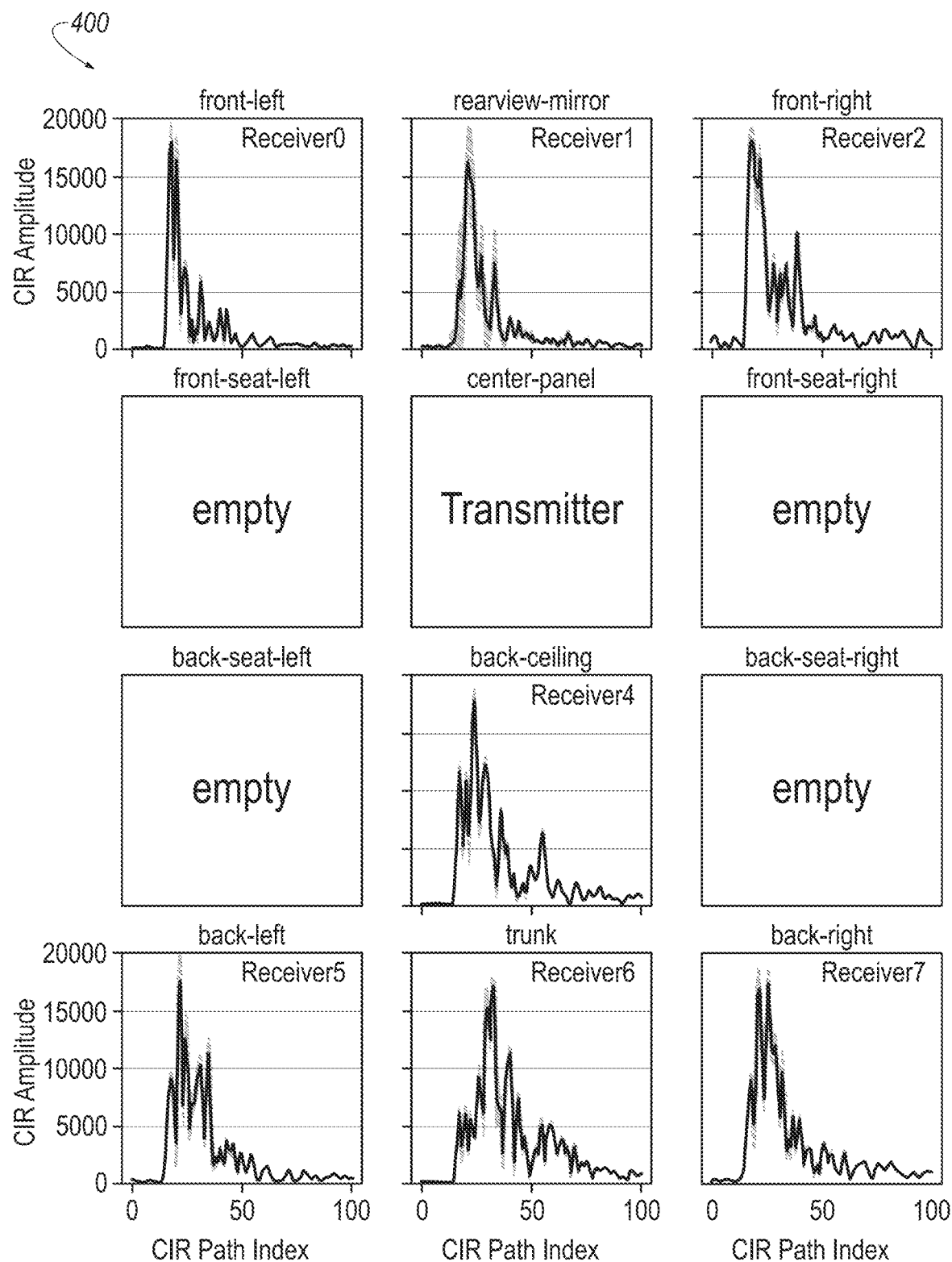
FIG. 4 shows an example of CIR variations of multiple Ultra-Wideband (UWB) receivers for an occupancy scenario in which the vehicle is empty.
Figure 5:
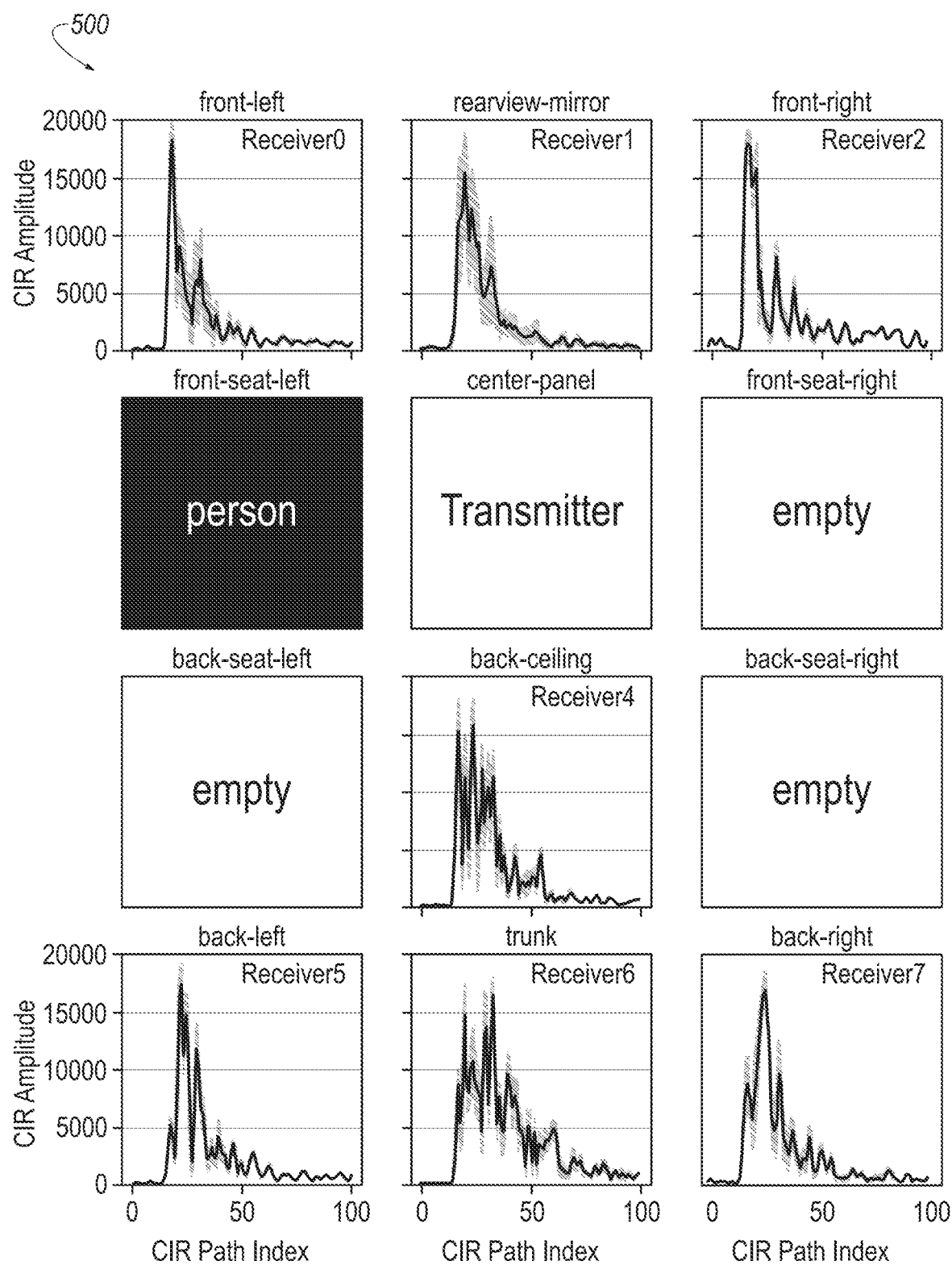
FIG. 5 shows an alternate example of CIR variations of multiple UWB receivers for an occupancy scenario in which a person is located in the driver seat.

FIG. 4 shows an example 400 of CIR variations of multiple UWB receivers for an occupancy scenario in which the vehicle is empty. FIG. 5 shows an alternate example 500 of CIR variations of multiple UWB receivers for an occupancy scenario in which a person is located in the driver seat. In each of the examples 400 and 500, graphical CIR representations of average and standard deviation (e.g., as shown in FIG. 3) are provided for a layout of UWB transceiver nodes 102 (e.g., in this example in the layout of the example UWB transceiver nodes 102 of FIG. 1). In this example layout, the UWB transceiver node 102 operating as the transmitter is located at the center panel of the vehicle, while the UWB transceiver nodes 102 acting as the receivers are located at different places in the vehicle. As one non-limiting example, these locations may include the front-left, the rearview-mirror, the front-right, front ceiling, the back-ceiling, center console, the back-left, the trunk, and the back-right of the vehicle.

It should be noted that while many examples herein relate to the vehicle environment, such techniques are also applicable to other environments including UWB transceiver nodes 102 or to other location applications. For instance, the techniques described herein may be used for determining occupant locations independent of seat location. As another possibility, the techniques described herein may be used for determining occupant locations in buildings or other structures having UWB transceiver node 102 installations. As yet a further possibility, the techniques described herein may be used for determining occupant locations in outdoor environments having UWB transceiver node 102 installations.

Regardless of the specific environment or locations, the CIR variations at each of the receiver UWB transceiver nodes 102 show different multi-path profiles for each of the occupancy scenarios. For example, the UWB transceiver nodes 102 at the front-left and rearview-mirror have high CIR variations between the examples 400 and 500 due to minor human movements when there is a person in the driver seat as shown in FIG. 5, while all UWB transceiver nodes have low CIR variations when the vehicle is empty as shown in FIG. 4. The CIR variations can be fed to machine learning algorithms for vehicle occupancy sensing.

Since wireless signals have different properties as digital images, such as spatial resolution and field of view, CNN models that are specifically designed for UWB data may be utilized. Using CIR data as input, the system 100 may use a deep learning model, having a multiple-input-multiple-output (MIMO) model with a multi-task mask (e.g., a Mask MIMO), to learn spatial/time features by 2D convolutions and per-seat attentions by the multi-task mask. The Mask MIMO is accurate and robust for unknown vehicle locations and unseen scenarios by learning spatial/temporal features from 2D convolutions and per-seat occupancy attentions from the multi-task mask. The model requires low training efforts for data collection, signal processing, feature engineering, and model training. The system 100 also has low computation cost and is practical to run in real-time on processors 104 such as embedded devices with constrained resources.

Figure 6:
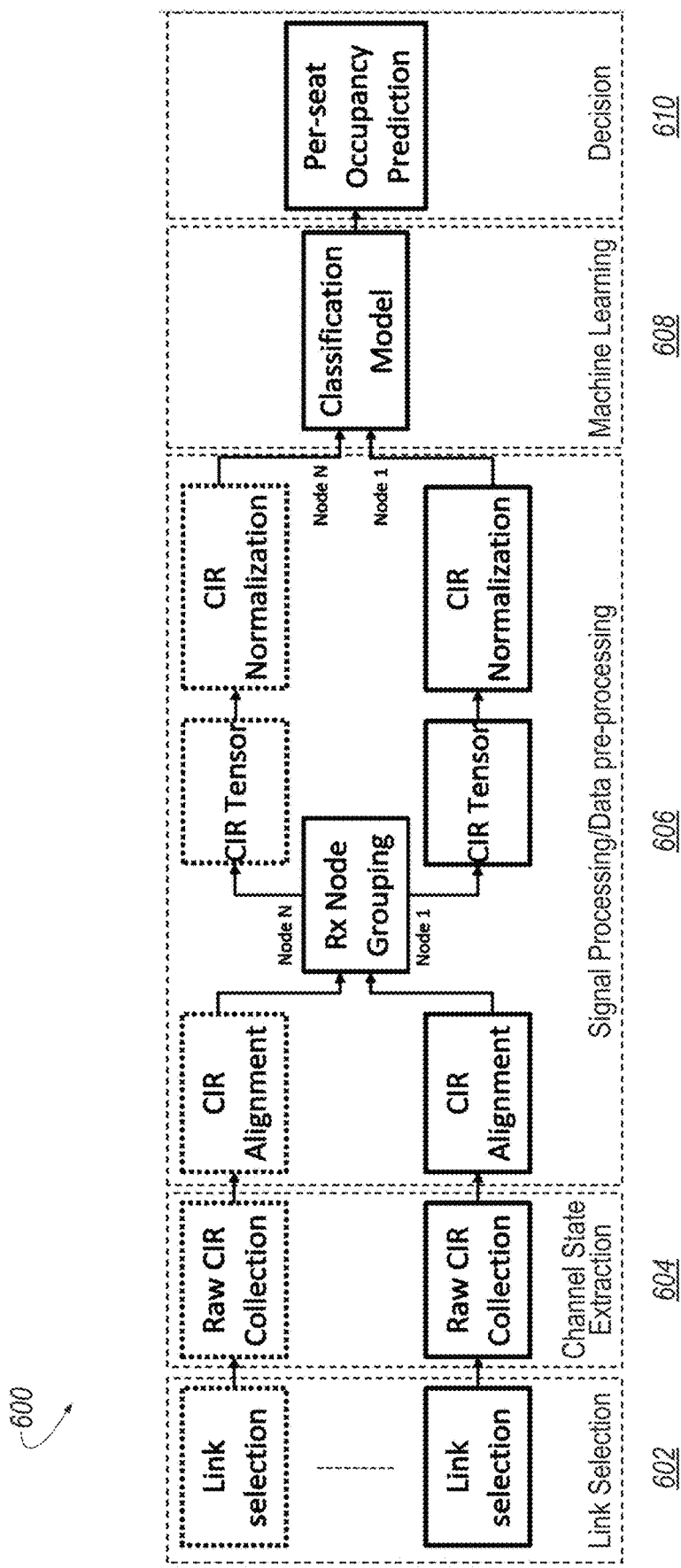
FIG. 6 shows an example data flow for occupancy sensing using ultra-wide band keyless infrastructure.

FIG. 6 shows an example data flow 600 for occupancy sensing using ultra-wide band keyless infrastructure. In an example, the data flow 600 may be accomplished by the processor 104 in communication with the UWB transceiver nodes 102. In general, the data flow 600 includes link selection 602, channel state extraction 604, signal processing/data pre-processing stage 606, machine learning using a classification model 608, and the determination of a decision 610 with respect to making a per-seat occupancy production.

With respect to link selection 602, for each UWB transceiver node 102 those features which contribute most to the prediction output of per-seat occupancy prediction are automatically or manually selected. These features may include, for instance, one or more of CIR amplitude and standard deviation, peaks/valleys, distances between peaks/valleys, number of peaks/valleys, etc. of the CIR data.

Using the selected data, the channel state extraction 604 is performed. This may include, for example capture of the CIR data from each of the UWB transceiver node 102, in accordance with the selected features. For instance, each receiver UWB transceiver node 102 may collect CIRs, and may send the decoded CIR measurements to the processor 104.

In an example, one of the UWB transceiver nodes 102 may operate as the transmitter and the remaining nodes UWB transceiver node 102 may operate as receivers. Continuing with the example UWB transceiver node 102 layout of FIG. 1, one of the UWB transceiver node 102 may be a transmitter while the other seven UWB transceiver nodes 102 may be receivers. Regardless of the layout or the quantity of UWB transceiver nodes 102, the UWB transceiver node 102 assigned to be the transmitter may be changed periodically (such as every 30 milliseconds), e.g., under the control of the processor 104. As one possibility, the UWB transceiver nodes 102 may be changed in a round robin order, where the current transmitter is changed to receiver and a next UWB transceiver nodes 102 in an ordered sequence of the UWB transceiver nodes 102 is changed to the transmitter.

The processing of the UWB CIR data as collected may include two aspects: the signal processing/data pre-processing stage 606 for converting the raw UWB signals to normalized CIR tensors, and the classification model 608 phase including a prediction of per-seat occupancy from the normalized CIR tensors resulting in a per-seat occupancy decision. Each of these is discussed in turn.

With respect to the channel state extraction 604, for UWB the transmitter and receiver are usually not time synchronized. Thus, the CIRs measured at different times may be randomly shifted with respect to each other. Accordingly, an initial stage of the signal processing/data pre-processing stage 606 may include performing a CIR alignment to translate the raw CIRs into a time series of CIRs that represent a multi-path profile in the consistent manner.

Figure 7:
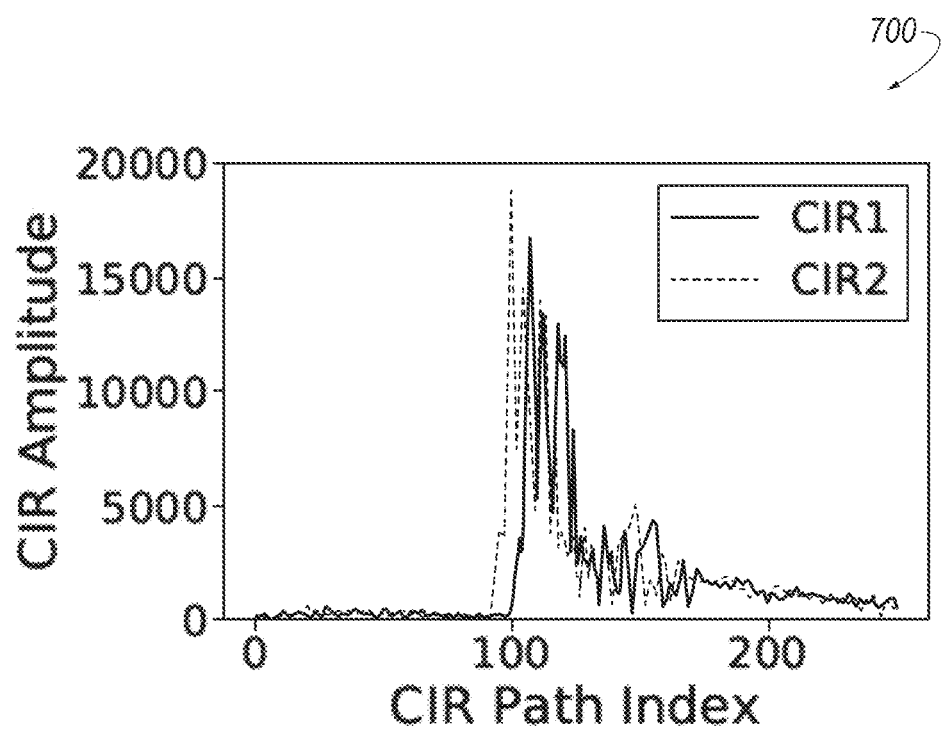
FIG. 7 shows an example of two misaligned CIRs.

FIG. 7 shows an example 700 of two misaligned CIRs. As shown, the Y-Axis represent CIR amplitude, while again the X-Axis represents an index of the number of the CIR path being illustrated. In the illustrated example 700, the two CIRs are separated by a time interval of approximately two seconds.

Figure 8:
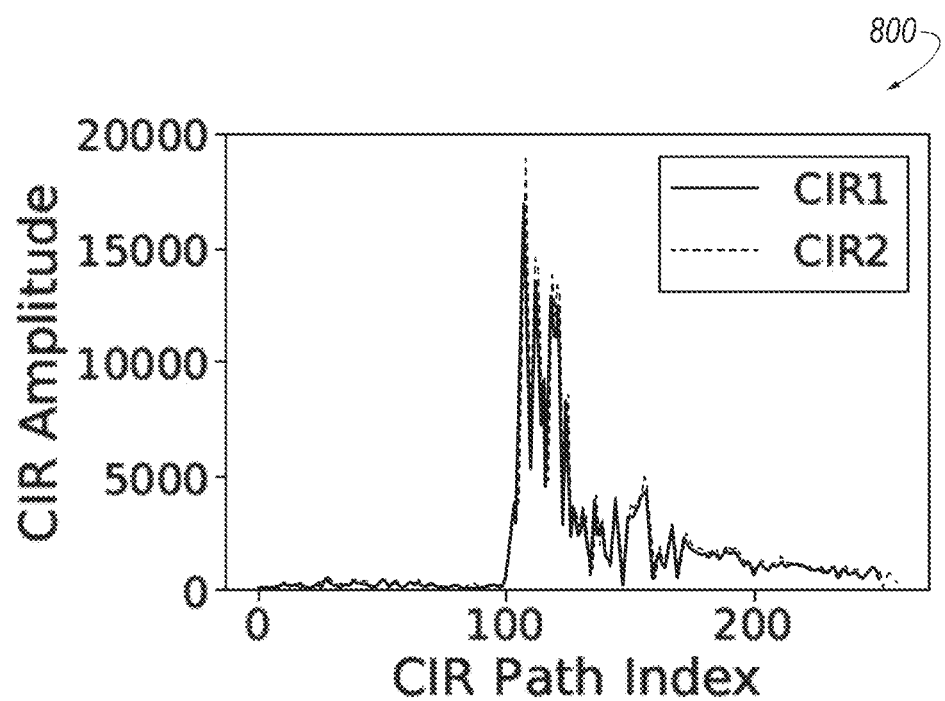
FIG. 8 illustrates an example of the two CIRs of FIG. 7 after alignment.

FIG. 8 illustrates an example 800 of the two CIRs of FIG. 7 after alignment. In one example, a first path index may be used to perform the CIR alignment. The first path index may be determined by a leading-edge detection algorithm that compares the receive power of each path with a threshold calculated from the noise estimation. The CIRs may be aligned by the first path index after removing the time shift.

Referring back to FIG. 6, the processor 104 having received the CIRs may conduct CIR alignment (e.g., using the first path index) to transform the raw CIRs to a time series of truncated CIRs of paths for each node (e.g., to accumulate a predefined number of paths for each node, such as 101 paths in one non-limiting example).

Responsive to completion of a predefined collection of data (e.g., in one example ten round robin circles), which corresponds to roughly 2.4 seconds, the CIR amplitude of the UWB transceiver node 102 are may be concatenated into a 4D CIR tensor according to a transmission node grouping. This 4D CIR tensor may be used as an input for further processing. Continuing with the example of FIG. 1, the size of the 4D CIR tensor may represent eight UWB transceiver nodes 102, seven receivers for each round, ten CIR blinks, and 101 CIR paths.

Continuing with the preprocessing, the 4D CIR tensors for training, validation, and testing may be normalized. In an example, this may be accomplished as follows:

$$x_{i|1\le i\le n_{train}}^{train} = \frac{|cir_i^{train}| - cir_{mean}^{train}}{cir_{std}^{train}}; \quad (2)$$

$$x_{j|1\le j\le n_{valid}}^{valid} = \frac{|cir_j^{train}| - cir_{mean}^{train}}{cir_{std}^{train}};$$

$$x_{k|1\le k\le n_{test}}^{test} = \frac{|cir_k^{train}| - cir_{mean}^{train}}{cir_{std}^{train}},$$

where:

$cir_{mean}^{train}$ is the average of the CIR amplitudes of the training samples;

$cir_{std}^{train}$ is the standard deviation of the CIR amplitudes of the training samples;

$|cir_i^{train}|$, $|cir_j^{train}|$, and $|cir_k^{train}|$ are the amplitudes of the 4D CIR tensors; and $n_{train}$, $n_{valid}$, and $n_{test}$ are the number of CIR tensors for training, validation, and testing, respectively.

Since $cir_{mean}^{train}$ and $cir_{std}^{train}$ are calculated using training samples, information with respect to the validation and testing samples is not leaked to the training process. The normalized CIR tensors represent the multi-path profiles inside the car in temporal and spatial domains. For example, when a person is sitting in the driver seat, the presence of the person introduces multi-path signal reflections for the UWB transceiver nodes 102 near the driver seat. The multi-path profiles of nearby UWB transceiver nodes 102 also change over time due to human activities such as gestures and breathing. This information can be used by machine learning models to learn temporal and spatial features for the vehicle occupancy sensing.

Having completed the CIR processing for converting the raw signals from the UWB transceiver nodes 102 into normalized CIR tensors, the machine learning classification model 608 uses the normalized CIR tensors to predict per-seat occupancy from the normalized CIR tensors.

The classification model may be designed based on the input data and the output target. The output of the classification model may include occupancy predictions of each car seat. A possible model architecture is using a single label for all the combinations of different car occupancy scenarios. For example, "0000" represents an empty car and "1000" means a person in the driver seat and no person in other three seats. In this case, the number of output classes is very large, for example, sixteen possible outputs to cover all combinations of "0" or "1" for four seating locations. This large quantity of outputs may increase the complexity of the model. Also, the large quantity of output classes may cause a bottleneck in the computation and optimization, which may increase difficulty in training the model.

The quantity of output classes can be addressed by utilizing a multi-task learning approach, in which multiple classification tasks are learned jointly. Multi-task learning accordingly reduces the complexity and improves the generalization, scalability, and flexibility of the classification algorithm. First, the output is divided into simpler tasks, e.g., binary classification of empty or occupied for each of seating locations (e.g., four seating locations in one non-limiting example). This reduces the complexity and computation cost of both the model architecture and the optimization algorithm, so the model is easier to train. Second, features learned from each task can improve other tasks, since different tasks are related. By learning multiple related tasks in parallel with a shared representation, multi-task learning is able to improve the overall performance of all tasks. Third, multi-task learning is scalable, and it is easy to add new tasks when new data are available. For example, the model can add "dog" for per-seat occupancy classification and train on the pre-trained model with additional data. Finally, multi-task learning is flexible to add weights to different tasks for multi-task learning. For example, the model can add a higher weight for the driver seat if the occupancy of the driver seat has a higher priority.

The input of the classification algorithm may take the form of the 4D tensors output from the signal preprocessing stage 606 described above. This input format affects design choices for the classification algorithm as well. The 4D tensors can use 4D convolutions for extracting feature maps. However, 4D convolutions have high time and space complexity, and may not be natively supported by deep learning frameworks such as TensorFlow and PyTorch. The 4D convolutions may be replaced with 3D or 2D convolutions using decomposed models, such as single-input multi-output (SIMO) or a multi-input multi-output (MIMO).

Figure 9:
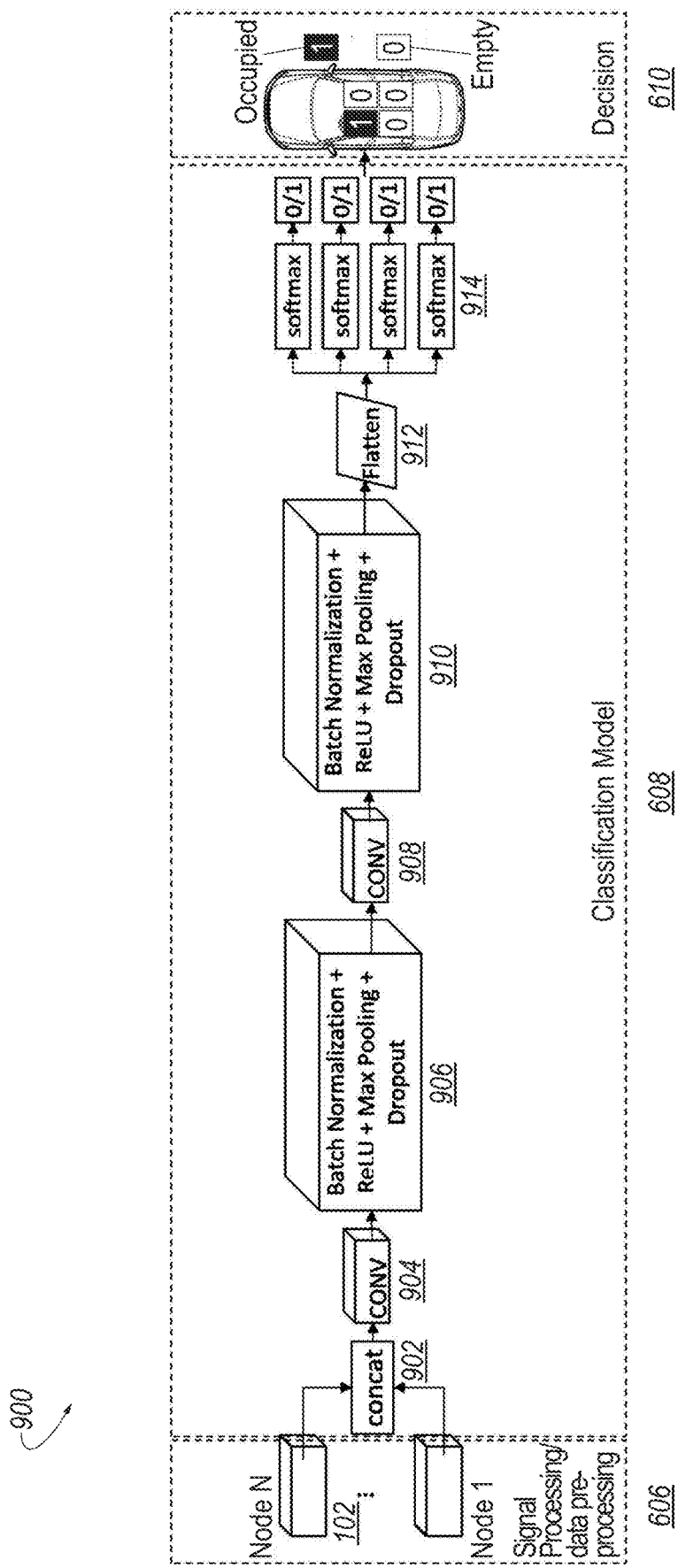
FIG. 9 illustrates an example detail of aspects of the data flow using a single-input multi-output classification model.

FIG. 9 illustrates an example detail 900 of aspects of the data flow 600 using a single-input multi-output (SIMO) classification model 608. As shown, the 3D CIR tensors of all the nodes are concatenated at 902 into a single 3D tensor. Using the example arrangement of UWB transceiver nodes 102 of FIG. 1 and the example approach mentioned above, this concatenation may represent eight UWB transceiver nodes 102, seven receivers for each round, with ten CIR blinks, and 101 CIR paths. Thus, purely for sake of explanation and not limitation, a data size of 7×10×101 from each of the seven receiving UWB transceiver nodes 102 may result in a concatenated data set of 56×10×101.

Next, 2D convolutions may be performed along the time and space domain. The pre-processed 3D CIR tensor of each node 102 may be fed to two convolutional layers 904 and 908, each followed by a respective activation layer 906 and 908. The sizing of the convolutional layers may vary, but generally the first convolutional layer 904 may be larger than the second convolutional layer 908. The activation layers 906 and 910 may include aspects such as batch normalization to normalizes the output such as by subtracting the batch mean and dividing by the batch standard deviation, Rectified Linear Unit (ReLU) to zero out negative activations, max pooling to downsample the resultant data, and dropout layers to drop out a random set of activations in that layer by setting them to zero to avoid overfitting. This data may be subjected to a flatten 912 operation to convert the data into a vector, and then a softmax layer 914 with the same number of nodes as the output (e.g., the number of seat locations) may be used to generate the final probabilities of seat occupancy.

For instance, purely for sake of explanation and not limitation, the convolutional layer 904 may utilize a 5×5 matrix to provide 256 outputs with an overall data size of 256×10×101, the activation layer 906 may perform pooling with a 3×3 matrix resulting in a data set of 256×3×33, and convolutional layer 908 may utilize a 3×3 matrix to provide 128 outputs with an overall data size of 128×3×33, and the activation layer 910 may perform pooling with a 3×3 matrix resulting in a data set of 128×1×11. This may be flattened into a vector of 1408×1 in size, from which the final outputs are determined, e.g., via softmax.

Figure 10:
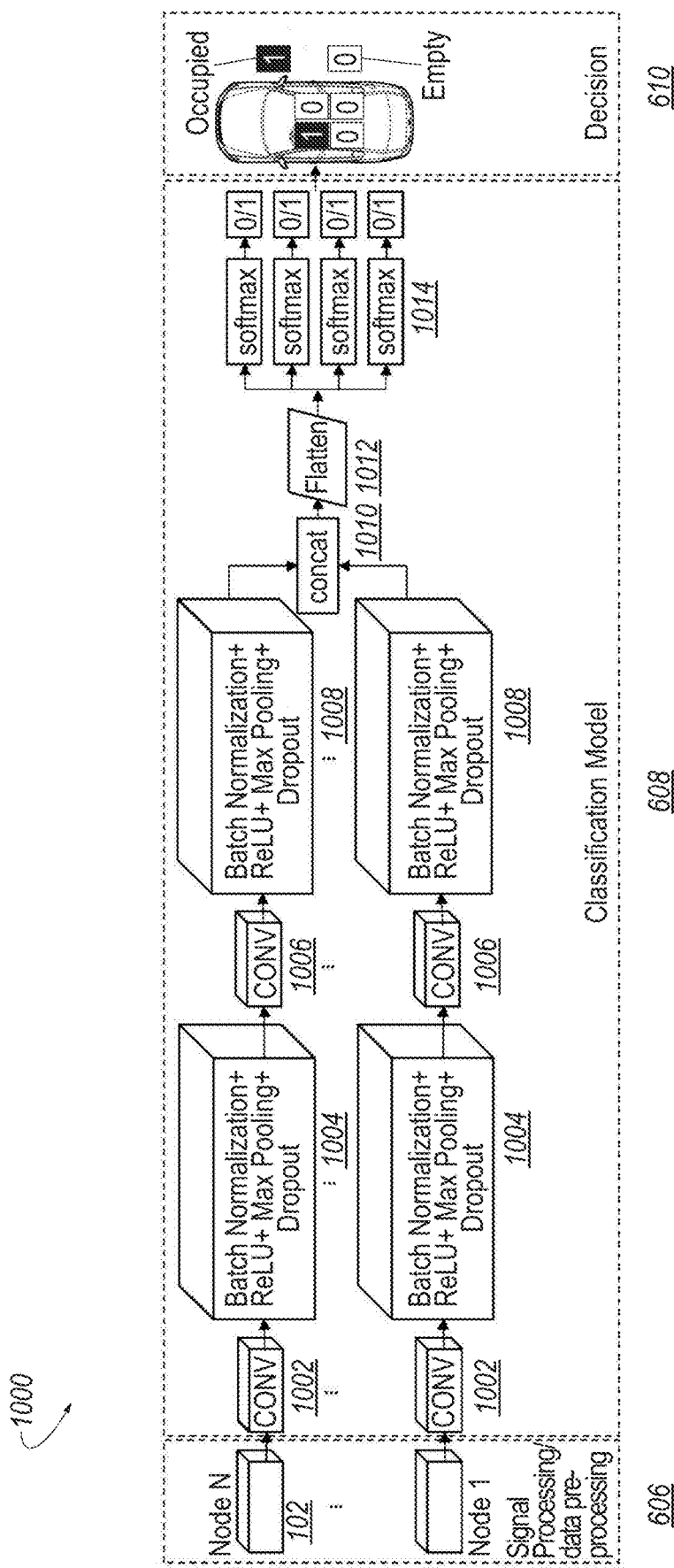
FIG. 10 illustrates an example detail of aspects of the data flow using a multi-input multi-output classification model.

FIG. 10 illustrates an example detail 1000 of aspects of the data flow 600 using a multi-input multi-output (MIMO) classification model 608. In this example, each UWB transceiver node 102 uses its own 2D convolution layer(s) 1002. For instance, instead of beginning with a concatenation, each UWB transceiver node 102 feeds its own data into a separate set of convolutional layers 1002 and 1006 and activation layers 1004 and 1008. It should again be noted that the size of the layers as well as the number of layers may vary from what is illustrated. The convolution outputs of the layers 1008 for each of the UWB transceiver nodes 102 are concatenated at 1010 into a single layer for multi-task classification, e.g., through flatten 1012 and a softmax layer 1014 similar to the flatten 912 and softmax layer 914 discussed above with respect to the SIMO classification model. For MIMO, the neural architecture of each node is the same but the neural weights of different nodes are different. Accordingly, in such an approach these layers 1002, 1004, 1006, 1008 learn features in space and time domains for each UWB transceiver node 102 independently.

For instance, purely for sake of explanation and not limitation, each convolutional layer 1002 may utilize a 5×5 matrix to provide 256 outputs with an overall data size of 256×10×101, each activation layer 1004 may perform pooling with a 3×3 matrix resulting in a data set of 256×3×33, each convolutional layer 1006 may utilize a 3×3 matrix to provide 128 outputs with an overall data size of 128×3×33, and each activation layer 1008 may perform pooling with a 3×3 matrix resulting in a data set of 128×1×11. These independent data sets may be concatenated into a data set of 128×8×11, and flattened into a vector of 11264×1, from which the final outputs are determined, e.g., again via softmax.

Significantly, however, SIMO and MIMO classification models 608 do not capture the spatial features that are correlated for different UWB transceiver nodes 102 and different seating locations. To address this, a multi-task mask may be added to the MIMO classification model 608 to learn multi-task attentions from multiple UWB transceiver nodes 102.

Figure 11:
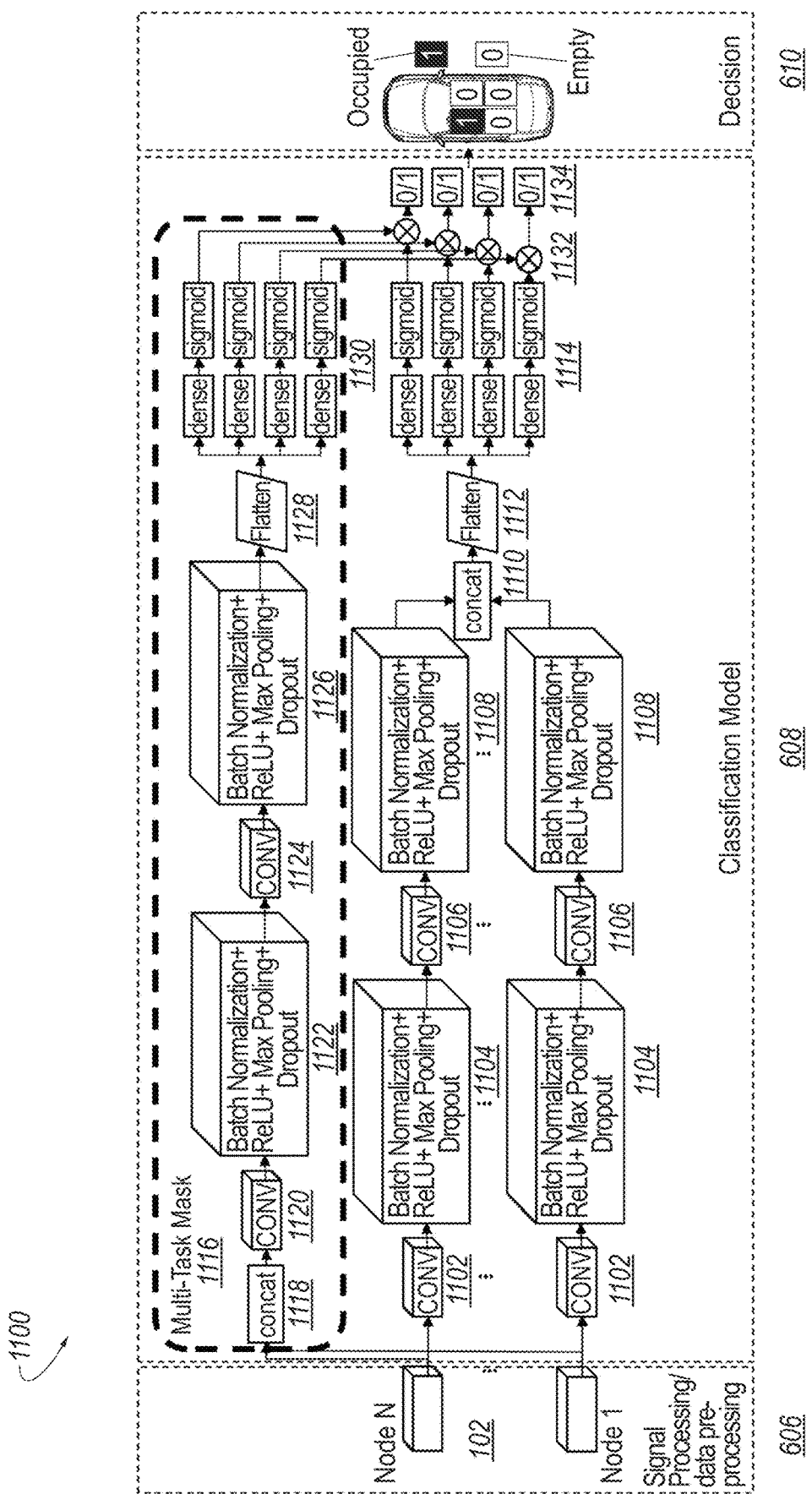
FIG. 11 illustrates an example detail of aspects of the data flow using a MaskMIMO classification model.

FIG. 11 illustrates an example detail 1100 of aspects of the data flow 600 using a MaskMIMO classification model 608. The MaskMIMO classification model 608 includes aspects similar to those described above with respect to the MIMO classification model 608. For instance, the elements 1102-1112 operate as discussed above with respect to elements 1002-1012, respectively. After flattening, the flattened vector is applied to a set of density layers 1114, one for each seating location. Each of the density layers 1114 transforms the high dimensional vector output at 1112 into a lower dimensional object vector. Additionally, the density layers 1114 output is applied to sigmoid activation functions to produce a pre-weighted probability output for occupancy at each respective seating location. Significantly, different UWB transceiver nodes 102 have different weights for the performance of different seating locations, since the UWB transceiver nodes 102 are placed at different locations inside the vehicle. Accordingly, these pre-weighted outputs are weighted utilizing a multi-task mask 1116 configured to learn the per-seat attentions and spatial features to automatically calculate the weights of different UWB transceiver nodes 102 and seating locations.

In the illustrated example implementation, the multi-task mask 1116 operates on a concatenation 1118 of the data from all of the UWB transceiver nodes 102, similar to the input to the SIMO classification model 608 discussed above. This concatenated data is then fed to a convolutional layer 1120, to an activation layer 1122, to another convolutional layer 1124 and to another activation layer 1126. The sizing of the convolutional layers 1120, 1124 as well as the number of layers may vary. The activation layers 1122 and 1126 may similarly include aspects such as batch normalization to normalizes the output such as by subtracting the batch mean and dividing by the batch standard deviation, Rectified Linear Unit (ReLU) to zero out negative activations, max pooling to downsample the resultant data, and dropout layers to drop out a random set of activations in that layer by setting them to zero to avoid overfitting. This data may be flattened 1128 into a vector, and then applied to a set of density layers 1130, one for each seating location, with a sigmoid activation function to produce multi-task weights for each seating location. The final per-seat occupancy predictions are then calculated by multiplication of the multi-task weights from the multi-task mask 116 and the softmax scores at multipliers 1132. These products may then be thresholded or otherwise applied to generate the final per-seat occupancy predictions at 1134 (e.g., binary predictions using a first value such as 1 for occupied, a second value such as 0 for unoccupied, etc.).

For instance, purely for sake of explanation and not limitation, the MIMO data size aspects may consistent with those described with respect to the MIMO classification model 608. Moreover, with respect to the operation of the multi-task mask 1116, also purely for sake of explanation and not limitation, the concatenation 1118 of the UWB transceiver node 102 data may result in a data vector of 56×10×101 dimension, the convolutional layer 1120 may utilize a 3×3 matrix to provide 128 outputs with an overall data size of 56×10×128, the activation layer 1122 may perform pooling with a 3×3 matrix resulting in a data set of 18×3×128, the convolutional layer 1124 may utilize a 3×3 matrix to provide 64 outputs with an overall data size of 56×10×64, and the activation layer 1126 may perform pooling with a 3×3 matrix resulting in a data set of 6×1×64. This data may be flattened into a vector of 384×1, from which the density outputs are determined as 128×1, which may be provided to the sigmoid functions to produce the multi-task weights for each seating location. Additionally, the respective density layers 1114 may reduce the flattened concatenation of 11264×1 size down to a more manageable size, such as 128×1, which may be applied to the sigmoid functions in that flow to determine the pre-mask-weighted probabilities. These pre-mask-weighted probabilities and the multi-task weights may accordingly be provided to the multipliers 1132.

Thus, the MaskMIMO classification model 608 learns both independent and shared features from multi-path profiles of multiple UWB transceiver nodes 102. The Mask-MIMO classification model 608 also utilizes the multi-task mask 1116 to learn spatial features and multi-task attentions from the UWB transceiver nodes 102 at different locations. Due to this design, the MaskMIMO classification model 608 may be robust to different unseen scenarios. Because Mask-MIMO classification model 608 is robust for different scenarios, the MaskMIMO classification model 608 does not need to collect a lot of data in different scenarios. Instead, the MaskMIMO classification model 608 may be trained by only four vehicle locations and provide robust and high accuracy for different unseen scenarios. Moreover, unlike other machine learning approaches such as k-nearest neighbors (kNN) and support vector machine (SVM) that usually need feature engineering/selection, the MaskMIMO classification model 608 may learn features automatically and may therefore require little to no human efforts for signal processing. Further, the MaskMIMO classification model 608 may use a multi-output CNN model so that it can be re-trained by new data or new tasks without restarting the training from scratch. Finally, the MaskMIMO classification model 608 has low computation cost and can run in real-time on embedded devices with constrained resources.

Figure 12:
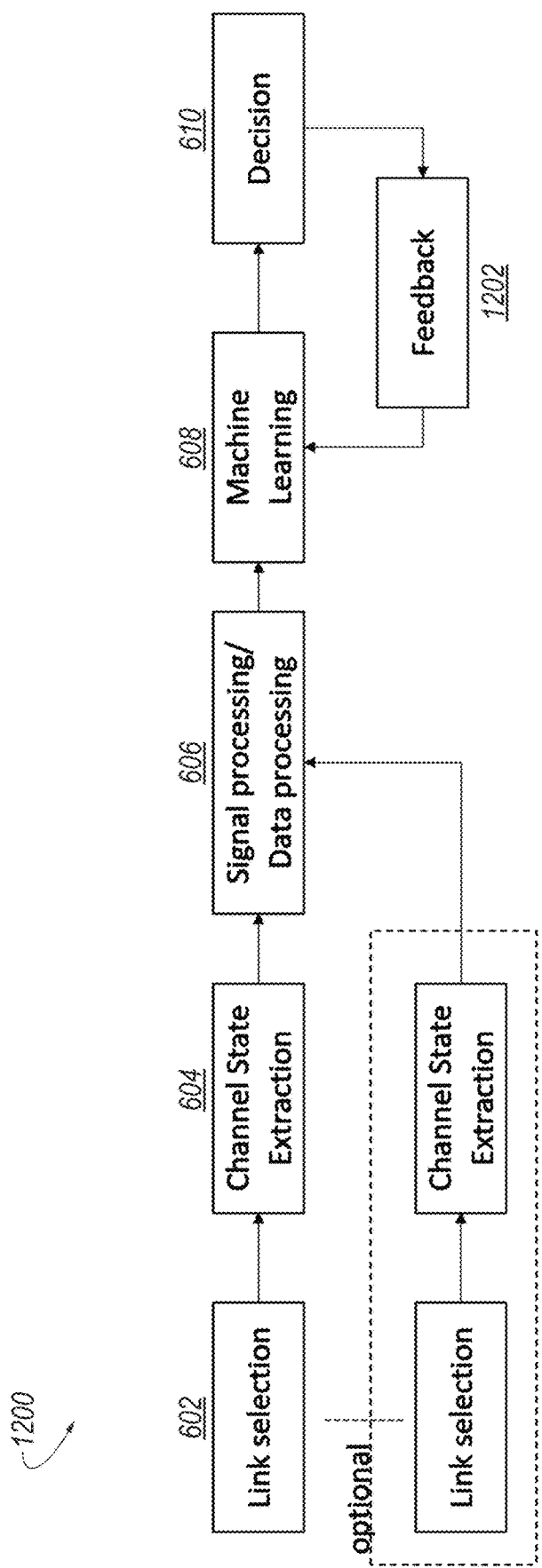
FIG. 12 illustrates an example data flow incorporating a feedback loop into the per-seat occupancy determination.

FIG. 12 illustrates an example data flow 1200 incorporating a feedback loop 1202 into the per-seat occupancy determination. This feedback loop 1202 may further improve performance during normal operation can. Similar to label data, the feedback may be received from various sources, such as manual input (e.g., a human in the loop) or using other sensor modalities (such as cameras, radars, seat weight sensors, etc.) to provide ground truth as a data input to train the MaskMIMO classification model 608 with respect to the occupancy determination.

Figure 13:
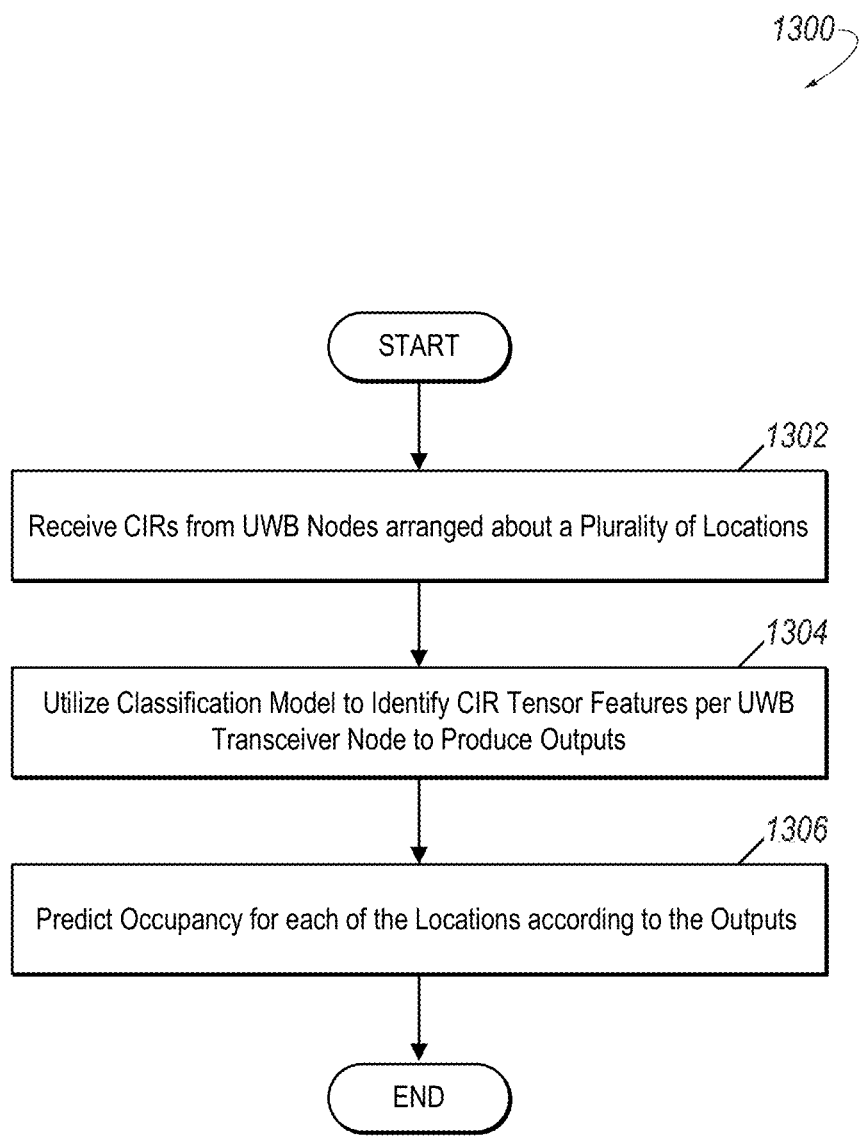
FIG. 13 illustrates a process for occupancy sensing using UWB keyless infrastructure.

FIG. 13 illustrates a process 1300 for occupancy sensing using UWB keyless infrastructure. In an example, the process 1300 may be performed using the techniques described in detail herein.

At operation 1302, channel impulse response (CIR) measurements are received from a plurality of UWB transceiver nodes 102 arranged about a plurality of locations. In some examples, the locations are seating locations, but in other examples, the locations may differ from the seating locations as the UWB transceiver nodes 102 may be designed for use in keyless authentication. In an example, one of the plurality of UWB transceiver nodes 102 is periodically reassigned to be a transmitter and the other of the plurality of UWB transceiver nodes 102 are periodically reassigned to be receivers. Thus, the CIR measurements of data from the UWB transceiver node 102 operating as a transmitter are collected from the UWB transceiver nodes 102 operating as receivers.

At operation 1304, a classification model 608 is used to identify features of CIR tensors formed from the CIR measurements for each of the UWB transceiver nodes 102 to produce outputs for each location. In one example, the classification model 608 may be a single-input multi-output classification model 608, and the CIR tensors of the plurality of UWB transceiver nodes 102 may be concatenated into a single 3D tensor for to the classification model 608. In another example, the classification model 608 may be a multi-input multi-output classification model 608, and the data from each of the UWB transceiver nodes 102 may be fed into a separate set of layers, where the outputs of the layers for each of the UWB transceiver nodes are concatenated into a single layer for multi-task classification.

In yet a further example, a multi-input multi-output (MIMO) classification of the MaskMIMO classification model 608 is utilized to identify features of the CIR tensors per UWB transceiver node to produce pre-weighted outputs for each seating location. In such an example, CIR tensors from each UWB transceiver node may be fed into separate respective sets of convolutional layers and activation layers. Outputs of the separate respective sets of layers may then be concatenated, and the concatenated outputs may be flattened for multi-task classification. The flattened concatenated outputs may be applied to a set of density layers, one for each seating location, with a sigmoid activation function to produce the pre-weighted outputs for each seating location. Additionally, a multi-task mask identifying multi-task attentions from the CIR tensors may be utilized to produce multi-task weights for each seating location. In an example, a concatenation of the CIR tensors from each UWB transceiver node may be fed into a set of convolutional layers and activation layers. The output of the layers may be flattened into a vector, and the flattened output may be applied to a set of density layers, one for each seating location, with a sigmoid activation function to produce the multi-task weights for each seating location. Moreover, the pre-weighted outputs may be weighted using the multi-task weights to produce final outputs that account for spatial features correlated across the UWB transceiver nodes. In an example, for each seating location, the pre-weighted output for the seating location may be multiplied by a corresponding multi-task weight for the seating location to determine a product.

With respect to the measurements, time synchronization may be performed to produce CIR tensors that are time-aligned across the UWB transceiver nodes. In an example, a first path index is determined by leading-edge detection to compare receive power of each path in the CIR measurements with a threshold calculated from a noise estimation of the CIR measurements; and the CIR measurements are aligned by the first path index to remove time shift between the CIR measurements. In some examples, the CIR tensors are also normalized.

At operation 1306, occupancy is predicted for each of the plurality of locations according to the final outputs. In an example, the products for each location may be thresholded to provide a binary seating occupancy prediction for each of the locations. In an example, the locations are seating locations.

Figure 14:
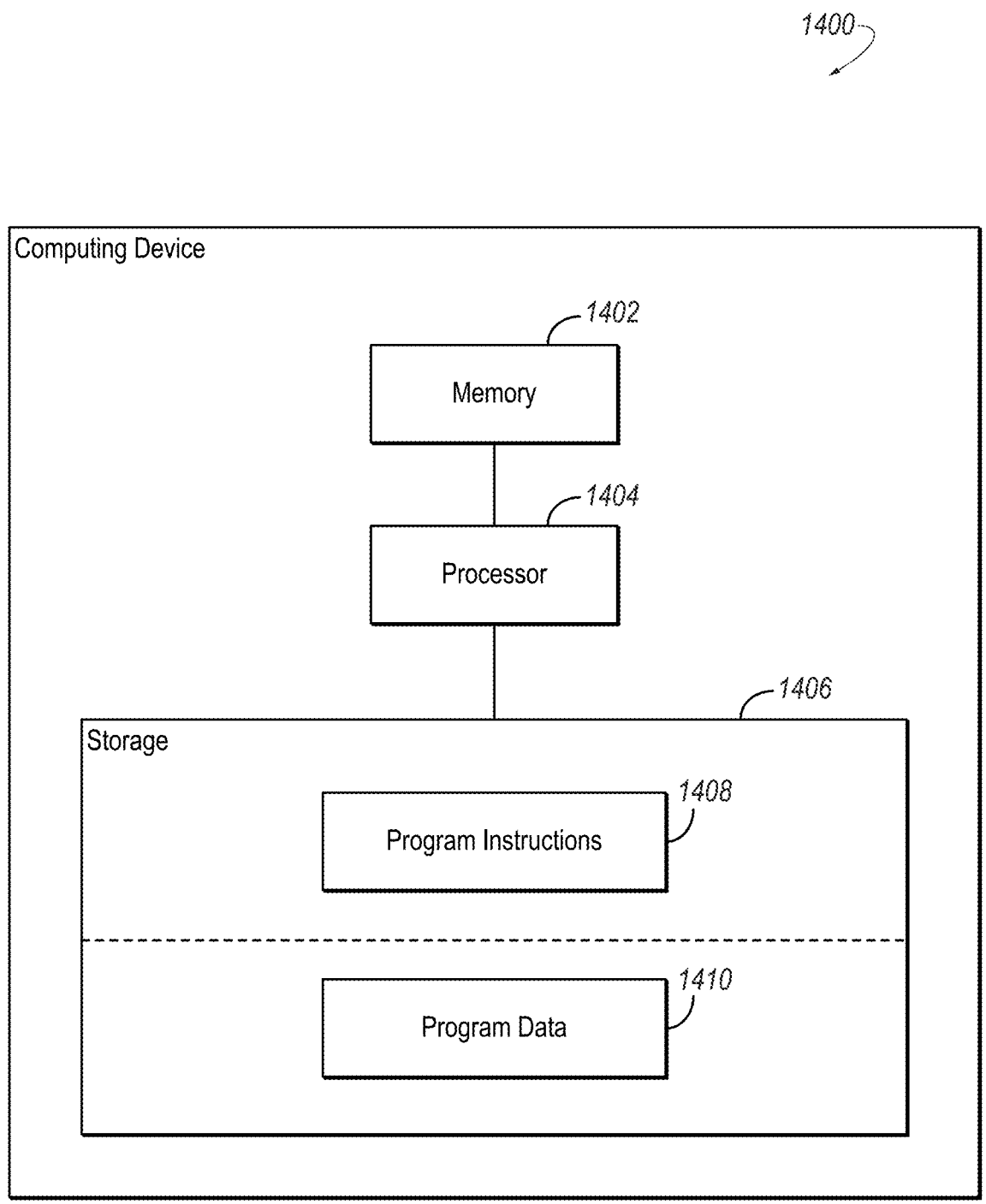
FIG. 14 illustrates an example computing device for occupancy sensing using UWB keyless infrastructure.

FIG. 14 illustrates an example computing device 1400 for occupancy sensing using UWB keyless infrastructure. The processor 104 may include such a computing device 1400. The operations performed herein, such as those shown in FIGS. 1-13, may be performed by such computing devices 1400. The computing device 1400 may include memory 1402, processor 1404, and non-volatile storage 1406. The processor 1404 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1402. The memory 1402 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 1406 may include one or more persistent data storage devices such as a hard drive, optical drive, tape drive, non-volatile solid-state device, cloud storage or any other device capable of persistently storing information.

The processor 1404 may be configured to read into memory 1402 and execute computer-executable instructions residing in program instructions 1408 of the non-volatile storage 1406 and embodying algorithms and/or methodologies of one or more embodiments. The program instructions 1408 may include operating systems and applications. The program instructions 1408 may be compiled or interpreted from computer programs created using a variety of programming languages and/or technologies, including, without limitation, and either alone or in combination, JAVA, C, C++, C#, OBJECTIVE C, FORTRAN, PASCAL, JAVA SCRIPT, PYTHON, PERL, and PL/SQL. In some examples, machine learning aspects may be implemented using deep learning frameworks such as TensorFlow and PyTorch.

Upon execution by the processor 1404, the computer-executable instructions of the program instructions 1408 may cause the computing device 1400 to implement one or more of the algorithms and/or methodologies disclosed herein. The non-volatile storage 1406 may also include data 1410 supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for occupancy sensing using ultra-wideband (UWB), comprising:
   receiving channel impulse response (CIR) measurements from a plurality of UWB transceiver nodes arranged about a plurality of locations;
   performing time alignment on the CIR measurements to time-align the CIR tensors across the UWB transceiver nodes; and
   utilizing a classification model to predict occupancy of objects in each of the plurality of locations based on the CIR tensors as time-aligned, formed from the CIR measurements from each of the UWB transceiver nodes.

2. The method of claim 1, further comprising:
   periodically reassigning one of the plurality of UWB transceiver nodes to be a transmitter and the other of the plurality of UWB transceiver nodes to be receivers; and
   collecting the CIR measurements of the one of the plurality of UWB transceiver nodes operating as a transmitter from the other of the UWB transceiver nodes operating as receivers.

3. The method of claim 1, further comprising normalizing the CIR tensors before applying the CIR tensors to the classification model.

4. The method of claim 1, wherein the classification model is a single-input multi-output classification model, and the CIR tensors of the plurality of UWB transceiver nodes are concatenated into a single 3D tensor as input to the single-input multi-output classification model.

5. The method of claim 1, wherein the classification model is a multi-input multi-output classification model, each of the UWB transceiver nodes feeds data into a separate set of layers, and outputs of the layers for each of the UWB transceiver nodes are concatenated into a single layer for multi-task classification.

6. The method of claim 1, wherein the classification model is a multi-input multi-output classification model using a multi-task mask, and further comprising:
   utilizing the multi-task mask to identify multi-task attentions from the CIR tensors to produce multi-task weights for each seating location; and
   weighting the outputs using the multi-task weights to produce outputs, as weighted, that account for spatial features correlated across the UWB transceiver nodes.

7. A system for occupancy sensing using ultra-wideband (UWB), comprising:
   a computing device including a processor programmed to:
      receive channel impulse response (CIR) measurements from a plurality of UWB transceiver nodes arranged about a plurality of locations;
      perform time alignment on the CIR measurements to time-align the CIR tensors across the UWB transceiver nodes; and utilize a classification model to predict occupancy of objects in each of the plurality of locations based on the CIR tensors as time-aligned formed from the CIR measurements from each of the UWB transceiver nodes.

8. The system of claim 7, wherein the processor is further programmed to:
periodically reassign, per channel, one of the plurality of UWB transceiver nodes to be a transmitter and the other of the plurality of UWB transceiver nodes to be receivers; and
collect the CIR measurements of the one of the plurality of UWB transceiver nodes operating as a transmitter from the other of the UWB transceiver nodes operating as receivers.

9. The system of claim 7, wherein the processor is further programmed to normalize the CIR tensors before applying the CIR tensors to the classification model.

10. The system of claim 7, wherein the classification model is a single-input multi-output classification model, and the processor is further programmed to:
concatenate the CIR tensors of the plurality of UWB transceiver nodes into a single 3D tensor; and
input the 3D tensor to the single-input multi-output classification model.

11. The system of claim 7, wherein the classification model is a multi-input multi-output classification model, and the processor is further programmed to:
feed data from each of the UWB transceiver nodes into a separate set of layers; and
concatenate outputs of the layers for each of the UWB transceiver nodes into a single layer for multi-task classification.

12. The system of claim 7, wherein the classification model is a multi-input multi-output classification model using a multi-task mask, and the processor is further programmed to:
utilize the multi-task mask to identify multi-task attentions from the CIR tensors to produce multi-task weights for each seating location; and
weight the outputs using the multi-task weights to produce outputs, as weighted, that account for spatial features correlated across the UWB transceiver nodes.

13. A non-transitory computer-readable medium comprising instructions for occupancy sensing using ultra-wideband (UWB) that, when executed by a processor, cause the processor to:
receive channel impulse response (CIR) measurements from a plurality of UWB transceiver nodes arranged about a plurality of locations;
perform time alignment on the CIR measurements to time-align the CIR tensors across the UWB transceiver nodes; and
utilize a classification model to predict occupancy of objects in each of the plurality of locations based on the CIR tensors as time-aligned, formed from the CIR measurements from each of the UWB transceiver nodes.

14. The medium of claim 13, further comprising instructions that, when executed by the processor, cause the processor to:
normalize the CIR tensors before applying the CIR tensors to the classification model; and
utilize the CIR tensors, as normalized and time-aligned, as input to the classification model.

15. The medium of claim 13, further comprising instructions that, when executed by the processor, cause the processor to:
periodically reassign, per channel, one of the plurality of UWB transceiver nodes to be a transmitter and the other of the plurality of UWB transceiver nodes to be receivers; and
collect the CIR measurements of the one of the plurality of UWB transceiver nodes operating as a transmitter from the other of the UWB transceiver nodes operating as receivers.

16. The medium of claim 13, wherein the classification model is a single-input multi-output classification model, and, further comprising instructions that, when executed by the processor, cause the processor to:
concatenate the CIR tensors of the plurality of UWB transceiver nodes into a single 3D tensor; and
input the 3D tensor to the single-input multi-output classification model.

17. The medium of claim 13, wherein the classification model is a multi-input multi-output classification model, and further comprising instructions that, when executed by the processor, cause the processor to:
feed data from each of the UWB transceiver nodes into a separate set of layers; and
concatenate outputs of the layers for each of the UWB transceiver nodes into a single layer for multi-task classification.

18. The medium of claim 13, wherein the classification model is a multi-input multi-output classification model using a multi-task mask, and further comprising instructions that, when executed by the processor, cause the processor to:
utilize the multi-task mask to identify multi-task attentions from the CIR tensors to produce multi-task weights for each seating location; and
weight the outputs using the multi-task weights to produce outputs, as weighted, that account for spatial features correlated across the UWB transceiver nodes.

* * * * *